United States Patent [19]

Korotkov et al.

[11] 3,984,756

[45] Oct. 5, 1976

[54] POWER SOURCE FOR SUPPLYING STABILIZED CURRENT TO ELECTRICAL INSTALLATIONS

[76] Inventors: Mikhail Yakovlevich Korotkov, ulitsa Bobruiskaya, 18, korpus 1, kv. 58; Nikolai Danilovich Moskalenko, ulitsa Belomorskaya, 4, kv. 43; Boris Vladimirovich Stefanov, ulitsa Mozhaiskoe shosse, 17, korpus 1, kv. 8; Klara Fedorovna Smirnova, ulitsa Kubinka, 5, Korpus 1, kv. 19; Viktor Egorovich Bulygin, ulitsa Matveevskaya 10, Korpus 5, kv. 13, all of Moscow, U.S.S.R.

[22] Filed: Apr. 10, 1974

[21] Appl. No.: 459,680

[52] U.S. Cl. .................................. 323/6; 323/61; 336/61; 336/174; 336/184
[51] Int. Cl.² ........................................ H02J 3/10
[58] Field of Search ............. 336/174, 175, 62, 232, 336/219, 184, 173; 323/6, 61

[56] References Cited
UNITED STATES PATENTS

| | | | |
|---|---|---|---|
| 1,394,044 | 10/1921 | Stephens | 336/62 X |
| 1,415,505 | 5/1922 | Angus | 336/175 X |
| 1,471,096 | 10/1923 | Brand | 336/62 |
| 2,577,825 | 12/1951 | Strickland, Jr. | 336/62 X |
| 2,929,036 | 3/1960 | Baxter | 336/62 |
| 3,175,175 | 3/1965 | Hauck | 336/175 |
| 3,451,023 | 6/1969 | Aveyard et al. | 336/219 |
| 3,473,105 | 10/1969 | Gutterman et al. | 323/6 |
| 3,503,026 | 3/1970 | Geisel et al. | 336/232 |
| 3,525,063 | 8/1970 | Wahlgren | 336/184 X |

FOREIGN PATENTS OR APPLICATIONS

| | | | |
|---|---|---|---|
| 1,027,055 | 5/1953 | France | 336/62 |
| 1,049,007 | 1/1959 | Germany | 336/62 |
| 266,207 | 7/1929 | Italy | 336/62 |

Primary Examiner—Thomas J. Kozma
Attorney, Agent, or Firm—Haseltine, Lake & Waters

[57] ABSTRACT

A power source for supplying stabilized current to electro-technological installations, comprising an induction-capacitance stabilizer with a power transformer and a short-length circuit comprised of a stationary bus conductor connected via flexible sections to an electro-technological installation, the primary winding of the transformer being uniformly distributed along the whole stationary bus conductor, embracing the latter cross-sectionwise, the stationary bus conductor being the secondary winding of the transformer.

8 Claims, 13 Drawing Figures

POWER SOURCE FOR SUPPLYING STABILIZED CURRENT TO ELECTRICAL INSTALLATIONS

The present invention relates to the art of electrical engineering, and more particularly to power sources for supplying stabilized current to electrical installations for electroconduction heating of metals and alloys thereof.

The present invention can be most advantageously used for supplying stabilized current to electric installations which consume heavy alternating current at low voltage, with the consumer electrodes being widely spaced apart.

These installations include electric conduction installations for heating metals and alloys thereof, vacuum arc furnaces, electroslag remelting furnaces, etc.

Known in the art are power sources for supplying stabilized alternating current to electric installations which installations include an inductance-capacitance current stabilizer, with a standard power matching transformer, a short-length circuit, comprised of a stationary bus conductor connected to the power matching transformer, and flexible moving bus conductors which are instrumental in effecting electric coupling to the movable electrodes of the installation. Power matching transformers which have found wide application in electric technological installations generally have magnetic circuits of a substantially cylindrical shape with windings which are mostly of a cylindrical shape, though sometimes square or rectangular. In the transformers of such embodiment the secondary winding embraces the primary winding over the whole perimeter, while the taps of the secondary winding are spaced at a minimum distance therebetween.

The power matching transformers of such a design ensure the lowest value of internal reactance, while on the other hand the reactance of individual bus conductors leading to distant electrodes of the installation tends to increase sharply.

The main disadvantages of the prior art power sources for supplying stabilized alternating current to electrical installations having widely spaced apart electrodes are a low power factor, considerable total power and voltage losses in the power matching transformer, the short-length circuit and the load, which have large reactances. In addition, a stabilized source with a low power factor of the matching transformer the short-length circuit and the load causes increased load unbalance in a three-phase circuit.

The value of a total power factor of the matching transformer, the short-length circuit and the load being variable, the electromagnetic interaction between the matching transformer windings, as well as the load current stabilization will be impaired.

It is an object of the present invention to provide a stabilized current source for supplying current to electrical installations, the power matching transformer, the short-length circuit and the load thereof having minimum total reactance and a relatively high power factor.

Another object of the present invention is to provide a package-type power matching transformer adapted to be built-in into an electrical installation.

Still another object of the present invention is to provide a power transformer whose power and winding interaction would be independent of any change of the transformation ratio.

Yet another object of the present invention is to provide a power transformer with a minimal no-load current which will exert a negligible effect on the stability of the current source, with the load current being adjustable within a wide range.

The object is achieved in a proposed stabilized current source for supplying electrical installations, comprising an inductance-capacitance current stabilizer with a power transformer and a short-length circuit, the latter comprised of a stationary bus conductor connected via flexible sections to the electric installation, wherein the magnetic circuit and the primary winding of said transformer are uniformly distributed along the whole stationary bus conductor, embracing the latter cross-sectionwise, the stationary bus conductor being the secondary winding of said transformer.

A power transformer of the above design is preferably disposed in an electrical installation in such a manner that the length of the connecting bus conductors of the short-length circuit would be mainly determined by the travel of the load current electrodes. In order to ensure the movement of the electrodes in the process of operating the electric installation, the connecting bus conductors are embodied as flexible conductors, their length being determined by the distance the electrodes have to be moved.

The magnetic circuit of said transformer preferably comprises several sections assembled of punched rectangular laminations of transformer steel. This will be helpful in reducing the no-load current of the power transformer.

The stationary bus conductor is preferably of a rectangular cross-section, with a duct provided along its entire length for the passage of a cooling liquid.

Pure soft water or any other more effective liquids that are safe to be used in electrical installations can be employed as the cooling agent.

The primary winding of the power transformer is preferably made as a single water-cooled layer, the turns thereof being disposed on two magnetic circuit cores, the turns on each core being arranged in such a manner that the ends of adjacent turns are disposed on the opposite sides of the magnetic circuit cores, each other turn being series-connected on both sides of each core, thus forming two series-connected sections of primary winding on each core.

The turns of said primary winding are preferably made of a profiled copper tube with a duct for the passage of cooling liquid which is displaced relative to the center line of the tube towards the inner side of the turn.

In order to achieve effective cooling of the primary winding of the power transformer, which will permit its overall size to be reduced and render the electrical installation more compact, one of the sections of the primary winding disposed on the first core of magnetic circuit is preferably connected with a hose made of an insulating material to the section of winding disposed on the second core of the magnetic circuit, while the other section of the winding disposed on the first core of the magnetic circuit is preferably connected with a similar hose to the other section of the primary winding disposed on the second core of the magnetic circuit, thus providing a duct for the passage of cooling liquid along the turns of these sections.

A fuller understanding of the nature and essence of the present invention will be had from the following detailed description thereof taken in conjunction with the accompanying drawings, wherein.

Figure 9:
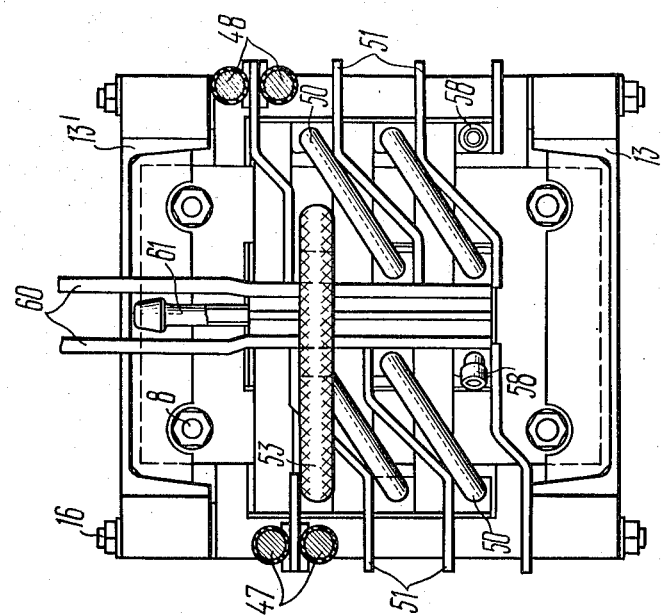
Figure 8:
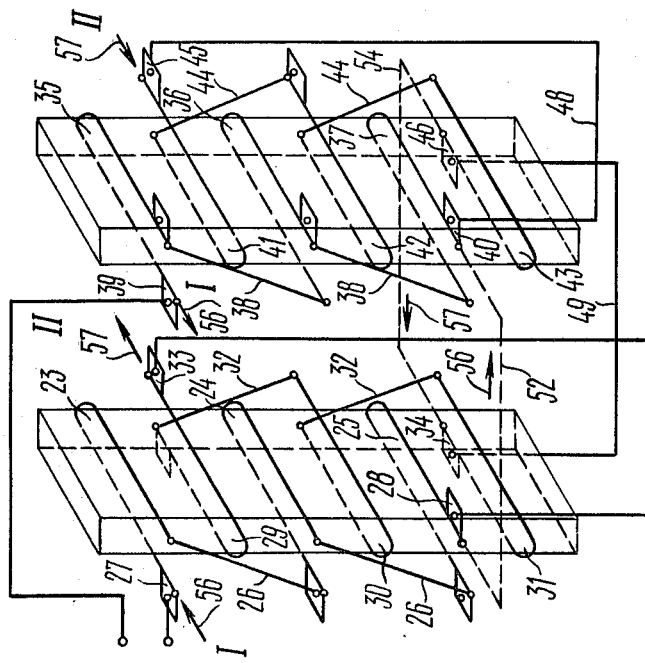
Figure 10:
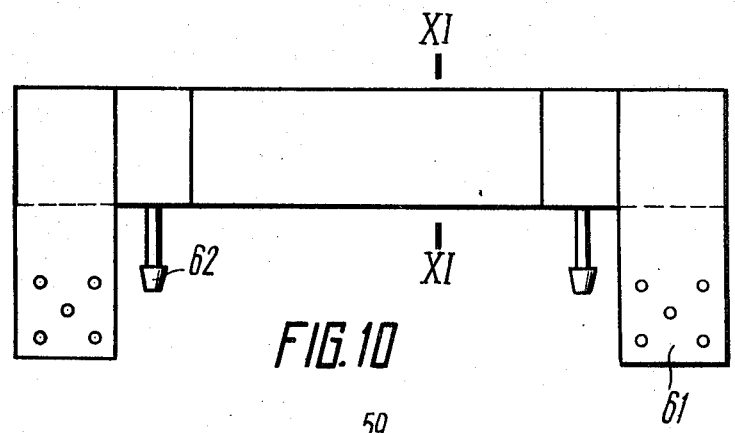
Figure 11:
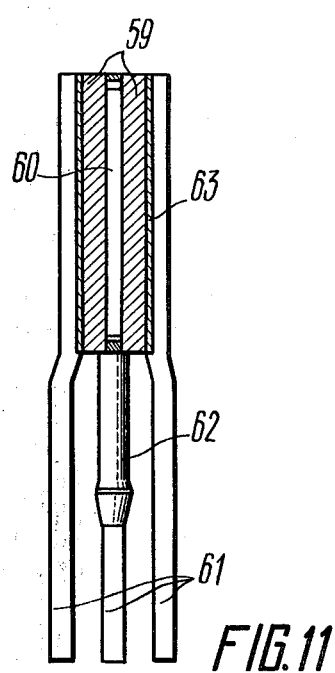
Figure 12:
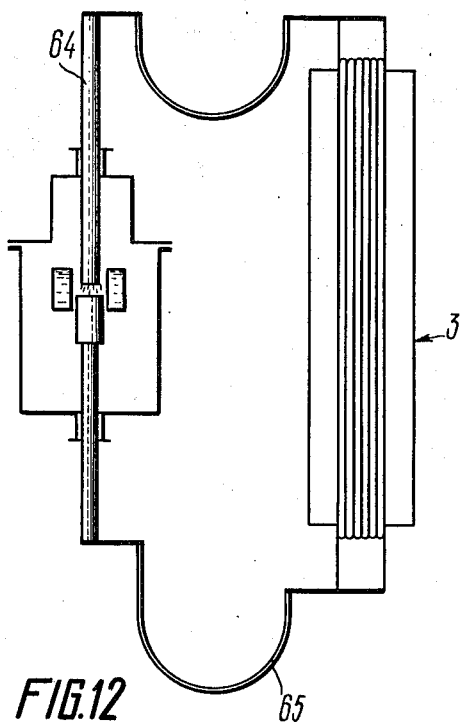
Figure 13:
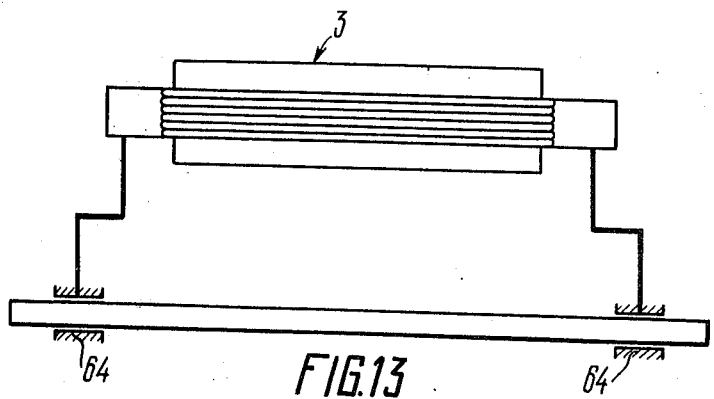

FIG. 8 diagrammatically illustrates current and cooling water connections of the primary winding turns of a power transformer according to the invention;

FIG. 9 is a front elevation view of a power matching transformer;

FIG. 10 illustrates the stationary portion of a bus conductor of the short-length circuit, which is the secondary winding of a matching transformer;

FIG. 11 is a section taken along line XI—XI in FIG. 10;

FIG. 12 diagrammatically illustrates the connection of a vertical electrical installation to a power transformer according to the present invention; and FIG. 13 diagrammatically illustrates the connection of a horizontal electrical installation to a power transformer according to the present invention.

Figure 1:
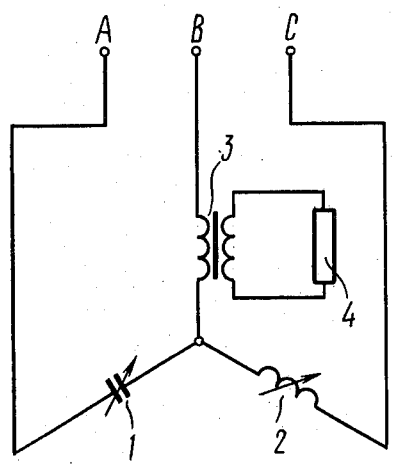
FIG. 1 is a schematic diagram of a stabilized current source for electrical installations.

The stabilized current source shown in FIG. 1 is a three-phase apparatus, comprising a capacitance 1 connected to the lagging or leading phase "A", a choke 2 connected to the retarding phase "C" and a power matching transformer 3 whose primary winding is connected to phase B while the secondary winding of the transformer 3 is connected to a load 4. The capacitance 1 and the choke 2 must have equal reactance while the free zero point of the star of the source, assembled of said elements 1, 2, 3, is moving according to the function $f(Z; R/Z)$ with the value of current in the primary winding of the power matching transformer 3 being stable, R and Z being the resistance and impedance of the load 4.

The total power factor of the power matching transformer, the short-length circuit and the load decreasing, the capacitance voltage and current will increase, causing a load unbalance in a three-phase circuit.

The power factor is increased and the voltage and power losses are reduced, in a power matching transformer of a novel design according to the present invention, wherein the transformer is combined with the stationary bus conductor of the short-length circuit.

Figure 2:
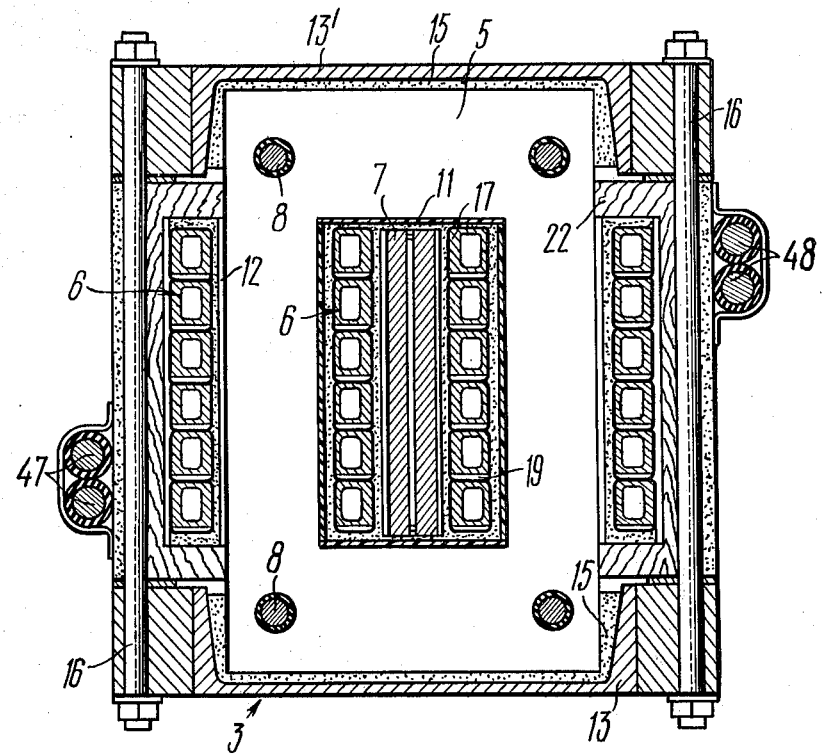
FIG. 2 is a cross-section of a power matching transformer according to the present invention.
Figure 3:
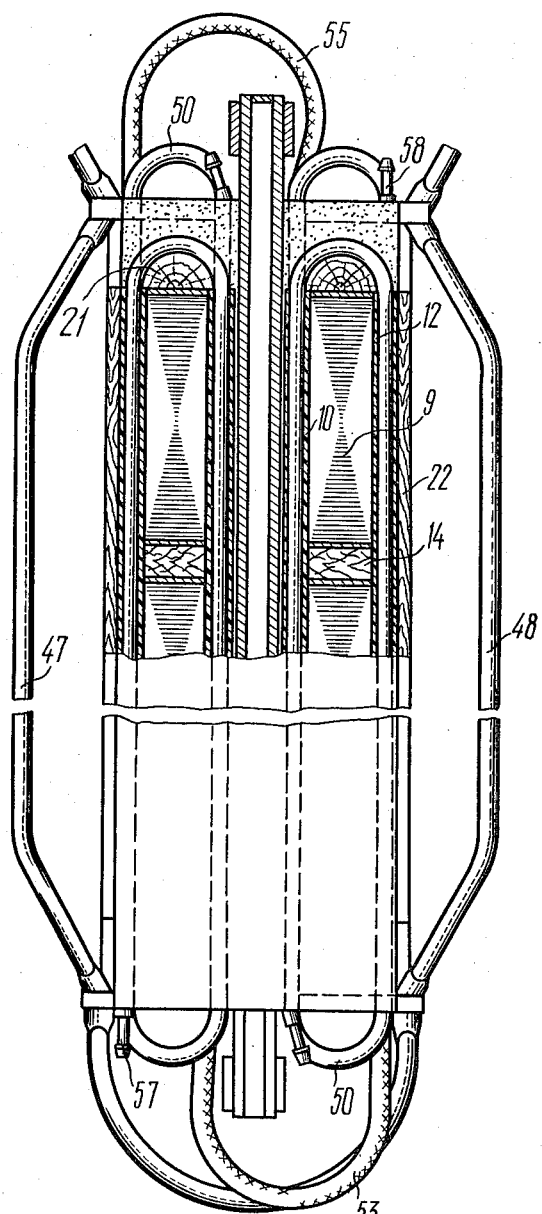
FIG. 3 is a plan view of the transformer shown in FIG. 2 with a partial cutout.

FIGS. 2 and 3 illustrate the power matching transformer 3 whose magnetic circuit 5 embraces the turns of a primary winding 6 and a stationary bus conductor 7 of the short-length circuit, which is the secondary winding of the transformer. The magnetic circuit 5 is preferably made of sheets of cold-rolled transformer steel, assembled into one or more sections coupled by at least four tie bars 8.

Figure 5:
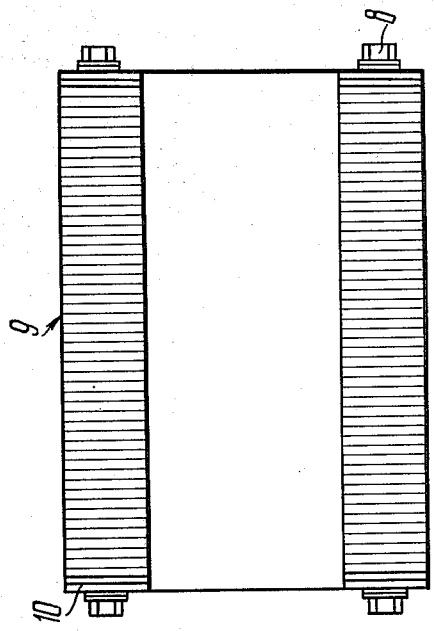
FIG. 5 is a side elevation view of the section of magnetic circuit shown in FIG. 4.
Figure 4:
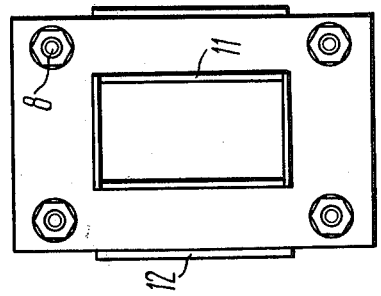
FIG. 4 is a front view of a section of the transformer magnetic circuit.

FIGS. 4 and 5 illustrate a section 9 of the magnetic circuit 5, made up of punched lamina. The transformer steel lamina are cut to be punched in such a manner that the core axis coincides with the direction of rolling, the cross section of the yoke being larger than the cross section of the core. A magnetic circuit made up of punched out lamina permits magnetizing ampere-turns to be substantially reduced and the magnetic flux density to be increased.

The punched-out lamina are then assembled into the magnetic circuit 5 shaped as shown in FIG. 4. Plates 10 shaped to suit the magnetic circuit are provided at both ends of each section 9 of the magnetic circuit 5. The tie rods 8 and plates 10 are insulated from the section 9 of magnetic circuit 5 to avoid short-circuited turns.

The magnetic circuit 5 cores are insulated with insulating sheet material 11, 12.

The magnetic circuit 5 shown in FIGS. 2 and 3 is made up of two sections 9 mounted on a common base 13.

The number of sections 9 in the magnetic circuit 5 is determined by the length of stationary bus conductor 7 of the short-length circuit, generally from one to six sections.

A large number of sections 9 of the magnetic circuit 5 is not expedient since it would impair the rigidity of the transformer.

Sealing gaskets 14 made for example, of wood and impregnated in oil, or of any other insulating material are inserted between the sections 9 of the magnetic circuit 5; after the sections 9 are aligned, the gaskets are covered with an epoxy-based compound or any other insulating material 15 (FIG. 2).

A top base 13¹ is prepared in a similar manner, thereafter the top and bottom bases 13 and 13¹ of the magnetic circuit 5 are coupled by means of tie rods 16, thus rendering the magnetic circuit 5 sufficiently rigid. The top and bottom bases 13 and 13¹ are manufactured of a non-magnetic material, for example steel.

Figure 6:
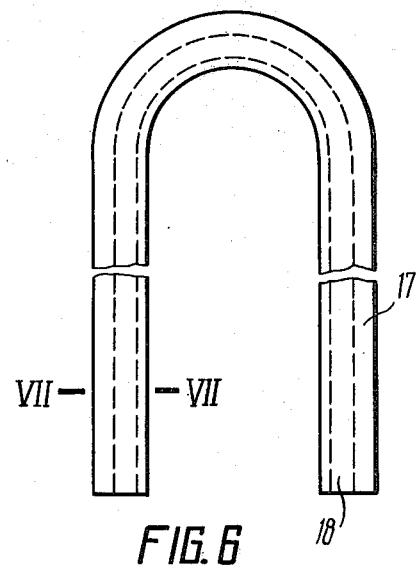
FIG. 6 is a turn of the primary winding of the power matching transformer.
Figure 7:
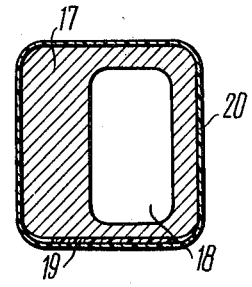
FIG. 7 is a section of the turn shown in FIG. 6, taken along line VII—VII.

The primary winding 6 of the transformer 3 is a single-layer, water-cooled winding, assembled of separate turns. Each turn (FIGS. 6, 7) is a U-shaped copper tube 17 of rectangular cross-section. A duct 18 in the tube 17 for the passage of cooling water is offest inside the turn as shown in FIG. 7.

Such embodiment of the duct 18 in the tube 17 permits bringing the current-conducting parts of the primary winding 6 closer to the current-conducting parts of the stationary bus conductor 7, which is the secondary winding of the transformer 5, thus reducing the leakage flux between the windings.

Turn-to-turn insulation is improved by providing a strip 19, made of a fiber-glass laminate or any other suitable insulating material, on the tube 17, which tube is further wrapped with an insulation tape 20 made of glass-micanite or any other heat-resistance insulation material.

The turns of the primary winding 6 (FIGS. 2, 3) made of copper tubes 17 are mounted on the cores of the magnetic circuit 5, and the end portions of the winding are fastened with oil-impregnated wooden wedges 21.

Each turn embraces the core of the magnetic circuit 5 longitudinally along its entire length, the ends of adjacent turns of the primary winding 6 being oppositely directed.

The external portions of the primary winding are covered with plates 22, made of insulation material, pressing the turns of the winding against the magnetic circuit.

FIG. 8 diagrammatically shows the connection of the turns of the primary winding and their arrangement on the cores of the magnetic circuit 5.

The turns 23, 24, 25 are arranged on the first core of the magnetic circuit 5 and connected together is series by means of jumpers 26, forming a section of the primary winding with taps 27 and 28 on the first core of the magnetic circuit 5.

The turns 29, 30, 31 on the primary winding are connected on the other end of the transformer by means of jumpers 32, forming the other section of the primary winding with taps 33 and 34, disposed on the same core of the magnetic circuit.

The turns 35, 36 and 37 arranged on the second core of the magnetic circuit are connected by means of jumpers 38, thus forming a section of the primary winding with taps 39, 40.

The turns 41, 42 and 43 are connected in series by means of jumpers 44, forming another section of the primary winding with taps 45, 46 arranged on the second core of the transformer magnetic circuit.

The tap 28 is electrically connected to the tap 33 by means of a jumper 47, with the result that the turns 23, 24, 25 and the turns 29, 30 and 31 form a portion of the primary winding disposed on the first core of the magnetic circuit.

The tap 40 is electrically connected by means of a jumper 48 to the tap 45 with the result that the turns 35, 36, 37 and 41, 42, 43 form another portion of the primary winding 61, disposed on the second core of the magnetic circuit 5.

These portions of the primary winding can be connected either in series or in parallel, thus forming the primary winding of the transformer.

Specifically, FIG. 8 illustrates the taps 34 and 46, connected in series by means of a jumper 49.

The jumpers 26, 32, 38 and 44 (FIG. 9) are made of mica-tape-insulated copper tubes 50, which tubes have the same cross-section as the tubes 17 forming the turns of the primary winding.

If the cross-section of the connecting tubes 50 is not sufficient, the tubes are shunted with copper jumpers 51.

Thus the turns 23, 24 and 25 form a common duct for the passage of cooling water, being connected to the turns 35, 36, 37 by means of a connector 52 made of a rubber hose 53 (refer to FIG. 3).

The turns 29, 30, 31 (FIG. 8) are connected to the turns 41, 42, and 43 by means of a connector 54 made of a rubber hose 55, thus forming a duct for the passage of cooling water. Arrows 56 indicate the flow of cooling water along the turns 23, 24, 25 and the turns 37, 36, 35.

Arrows 57 indicate the flow direction of the cooling water along the turns 41, 42, 43 and 31, 30, 29, with the cooling water inlet and outlet being so arranged that the turns of the primary winding will be always filled with water even in case of a breakdown.

Pipe unions 58 (refer to FIG. 9) serve as inlet and outlet connections for the coolant.

After the turns of the primary winding 6 (FIG. 2) have been mounted on the cores of the magnetic circuit 5, a stationary bus conductor 7 of the short-length circuit, which bus simultaneously serves as the secondary winding of the power matching transformer, is arranged inside the magnetic circuit 5 between the turns thereof.

The stationary portion of the bus conductor 7 of the short-length circuit, which is used as the secondary winding of the matching transformer is shown in FIGS. 10 and 11.

The stationary bus conductor can be provided by welding together two copper bus conductors 59 as shown in FIG. 11, or by shaping a suitable copper tube to suit the shape of the bus conductor shown in FIG. 11, or else by pressing a hollow rolled stock of a rectangular cross section. A duct 60 between the bus conductors 59 serves for the passage of a coolant, which coolant in the present case is water.

For the purpose of connecting a load to the power transformer the bus conductor is provided with lead-outs 61 in the form of copper buses or in the form of a flexible bus conductor having a suitable cross-section, whereas the coolant inlet and outlet are embodied as two pipe connectors 62 which communicate with the duct 60.

The bus conductor is insulated by glass-mica-tape 63 strips or with the help of any other suitable insulating material.

FIG. 12 schematically illustrates the arrangement involving the transformer 3 of the described design used in vertical electo-technological installations, including movable electrodes 64 which are spaced apart in the vertical plane, as in the case, for example, in vacuum arc furnaces, electroslag-remelting furnace, etc.

The FIG. 12 also shows flexible current conductors 65 from the power transformer to the movable electrodes 64 of the apparatus.

In the case of stationary electrodes, the current conductors are made as rigid elements with thermal compensators provided for changing the distance between the electrodes of the installation.

FIG. 13 illustrates a schematic layout of the power transformer 3 for horizontal installations (not shown in the Figure), and electrodes 64 which are spaced apart in the horizontal plane, for example in electric-conduction installations, electro-conduction type muffle heating apparatuses, etc.

While particular embodiments of the invention have been shown and described in detail, various modifications thereof will be apparent to those skilled in the art and therefore it is not intended that the invention be limited to the disclosed embodiments or to the details thereof and the departures may be made therefrom within the spirit and scope of the invention.

What is claimed is:

1. A power source for supplying stabilized current to electro-technological installations, comprising an induction-capacitance current stabilizer with a power transformer and a short-length circuit, the latter comprising a stationary bus conductor adapted to be connected via flexible sections to an electro-technological installation; said power transformer including a magnetic circuit with two legs and a primary winding uniformly distributed along said stationary bus conductor, embracing the latter cross-sectionwise; said stationary bus conductor being the secondary winding of said power transformer, said magnetic circuit of the transformer comprising a plurality of sections assembled of rectangular punched-out laminations of transformer steel, said stationary bus conductor having a rectangular cross section with a duct provided along the entire length thereof for the passage of a cooling liquid, said primary winding being a single-layer water-cooled winding whose turns are disposed on the two legs of the magnetic circuit such that the ends of adjacent turns are arranged on the opposite sides of the legs of the magnetic circuit, every other turn being connected in series on both sides of the legs, forming two sections on each leg, said sections being electrically connected to each other in series.

2. A power source as claimed in claim 1, wherein the turns of the primary winding of the transformer are made of a profiled copper tube having a duct for the passage of a cooling liquid, which duct is displaced relative to the center line of the tube towards the inner side of the turn.

3. A power source as claimed in claim 2, wherein one of the sections of the primary winding disposed on the first leg of the magnetic circuit is connected in series by means of a hose made of an insulating material to the section of the primary winding disposed on the second leg of the magnetic circuit, whereas the other section of the primary winding disposed on the first leg of the magnetic circuit is connected by means of another hose also made of an insulating material, to the other section of the winding disposed on the second leg of the magnetic circuit, thus forming a duct for the passage of a cooling liquid along the turns of said sections.

4. A power source for the supply of stabilized current, comprising an induction capacitance current stabilizer with a power transformer and a short-length circuit, the latter comprising a stationary bus conductor adapted for connection to a load; said power transformer including a magnetic circuit with two legs and a primary winding uniformly distributed along said stationary bus conductor and embracing the latter cross-sectionwise; said stationary bus conductor being the secondary winding of said power transformer, said primary winding being a single-layer water-cooled winding including turns disposed on the two legs of the magnetic circuit such that the ends of adjacent turns are arranged on opposite sides of the legs of the magnetic circuit, every other turn being connected in series on both sides of the legs, forming two sections on each leg, said sections being electrically connected to each other in series.

5. A power source as claimed in claim 4 wherein said magnetic circuit of the transformer comprises a plurality of sections assembled of rectangular punched-out laminations of transformer steel.

6. A power source as claimed in claim 4, wherein said stationary bus conductor has a rectangular cross section with a duct provided along the entire length thereof for the passage of a cooling liquid.

7. A power source as claimed in claim 4, wherein the turns of the primary winding of the transformer are made of a profiled copper tube having a duct for the passage of a cooling liquid, said duct being displaced relative to the center line of the tube towards the inner side of the turn.

8. A power source as claimed in claim 7 comprising a hose made of an insulating material connecting one of the sections of the primary winding disposed on the first leg of the magnetic circuit in series to the section of the primary winding disposed on the second leg of the magnetic circuit, and a second hose of an insulating material connecting the other section of the primary winding disposed on the first leg of the magnetic circuit to the other section of the winding disposed on the second leg of the magnetic circuit, thus forming a duct for the passage of a cooling liquid along the turns of said sections.

* * * * *